(12) United States Patent
Kim et al.

(10) Patent No.: US 7,585,078 B2
(45) Date of Patent: Sep. 8, 2009

(54) ILLUMINATION SYSTEM CAPABLE OF ELIMINATING LASER SPECKLE AND PROJECTION SYSTEM EMPLOYING THE SAME

(75) Inventors: Sung-ha Kim, Seoul (KR); Sang-whoe Dho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 632 days.

(21) Appl. No.: 11/183,874

(22) Filed: Jul. 19, 2005

(65) Prior Publication Data

US 2006/0028961 A1    Feb. 9, 2006

(30) Foreign Application Priority Data

Aug. 5, 2004    (KR) .................... 10-2004-0061791

(51) Int. Cl.
| | |
|---|---|
| G03B 21/14 | (2006.01) |
| G02B 26/08 | (2006.01) |
| G03H 1/02 | (2006.01) |
| G02F 1/1335 | (2006.01) |
| H04N 5/74 | (2006.01) |

(52) U.S. Cl. .................... 353/82; 353/84; 353/20; 353/38; 359/197; 359/27; 362/561; 348/771

(58) Field of Classification Search .................... 353/82, 353/84, 20, 38; 359/197, 27; 362/561; 348/771
See application file for complete search history.

(56) References Cited

U.S. PATENT DOCUMENTS

| | | | |
|---|---|---|---|
| 4,035,068 A | 7/1977 | Rawson | |
| 5,463,497 A | 10/1995 | Muraki et al. | |
| 5,621,529 A | 4/1997 | Gordon et al. | |
| 6,259,561 B1 | 7/2001 | George et al. | |
| 6,577,429 B1 * | 6/2003 | Kurtz et al. | .................. 359/279 |
| 6,606,173 B2 | 8/2003 | Kappel et al. | |
| 6,726,333 B2 * | 4/2004 | Huibers et al. | ................. 353/84 |
| 7,433,124 B2 * | 10/2008 | Kim et al. | .................... 359/569 |

(Continued)

FOREIGN PATENT DOCUMENTS

CN    1083932 A    3/1994

(Continued)

OTHER PUBLICATIONS

Dutch Search Report dated Nov. 26, 2007 issued in NL 1029680.

(Continued)

*Primary Examiner*—Diane I Lee
*Assistant Examiner*—Magda Cruz
(74) *Attorney, Agent, or Firm*—Stanzione & Kim LLP (57) ABSTRACT

Provided are an illumination system capable of eliminating laser speckle and a projection system employing the illumination system. The illumination system includes a laser light source having at least one laser, and a first diffractive optical element to divide a laser beam emitted from the laser light source into a plurality of partial beams and to time-average the partial beams through a periodical movement to eliminate speckle. Accordingly, the illumination system can eliminate speckle of the beams emitted from the laser light source and the projection system employing the illumination system can achieve a high quality image.

25 Claims, 5 Drawing Sheets

U.S. PATENT DOCUMENTS

2003/0174755 A1    9/2003  Lai et al.

FOREIGN PATENT DOCUMENTS

| DE | 19710660 A1 | 9/1998 |
| EP | 0589179 A1 | 3/1994 |
| EP | 1292134 A2 | 3/2003 |
| JP | 04-352139 | 12/1992 |
| JP | 05-260424 | 10/1993 |
| JP | 2002-90881 | 3/2002 |
| JP | 2003-270585 | 9/2003 |
| KR | 2003-4780 A | 1/2003 |
| KR | 2004-12971 | 2/2004 |
| WO | WO 00/65401 | 11/2000 |

OTHER PUBLICATIONS

Chinese Office Action dated Oct. 13, 2006 issued in CN 2005-10089116.8.

* cited by examiner

ILLUMINATION SYSTEM CAPABLE OF ELIMINATING LASER SPECKLE AND PROJECTION SYSTEM EMPLOYING THE SAME

CROSS-REFERENCE TO RELATED APPLICATIONS

This application claims the priority under 35 U.S.C. § 119 of Korean Patent Application No. 2004-61791, filed on Aug. 5, 2004, in the Korean Intellectual Property Office, the disclosure of which is incorporated herein in its entirety by reference.

BACKGROUND OF THE INVENTION

1. Field of the Invention

The present general inventive concept relates to an illumination system capable of eliminating speckle of laser beams emitted from a laser light source and a projection system employing the illumination system, and more particularly, to an illumination system and a projection system which can effectively reduce or eliminate laser speckle by moving a diffractive optical element and time-averaging partial beams.

2. Description of the Related Art

Since projection systems including a laser light source have a wide color gamut, they have excellent collimation and high light efficiency. However, such projection systems have speckle due to coherent illumination. Speckle results from an interferential interaction of coherent waves that are scattered from a diffusely reflecting surface. Such speckle constitutes a significant cause of deterioration in image resolution and quality.

A conventional projector for eliminating speckle disclosed in U.S. Pat. No. 6,606,173 B2 is illustrated in FIGS. 1 and 2.

Figure 1:
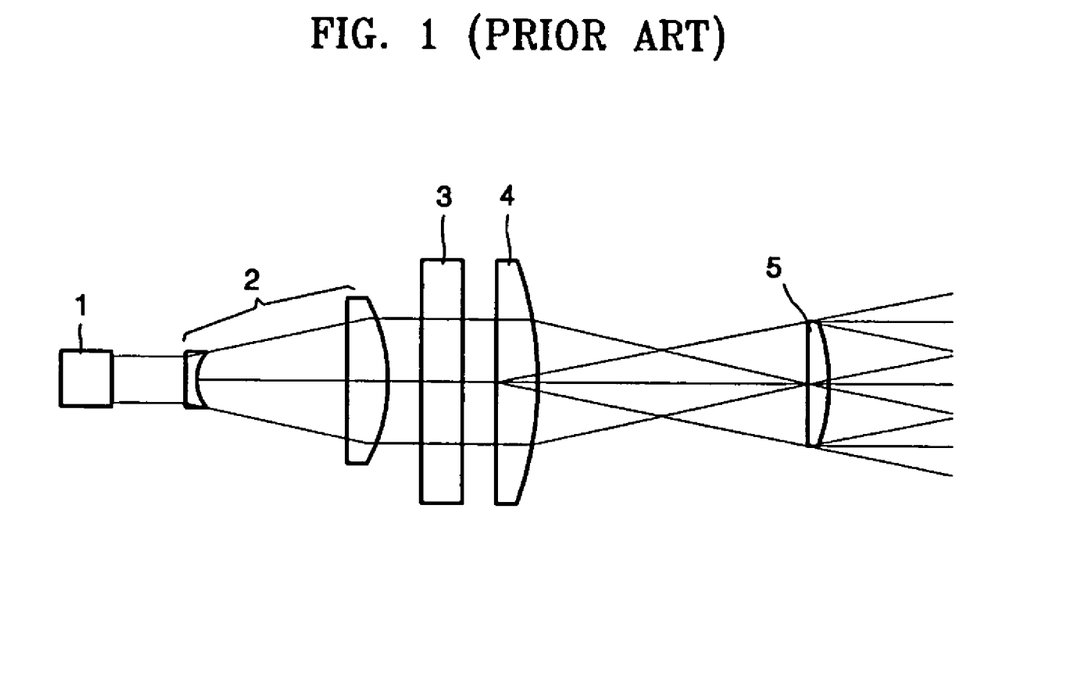
FIG. 1 is a diagram illustrating a conventional illumination system for a laser projector.

Referring to FIG. 1, the conventional projector includes a laser light source 1, a beam expander 2, a holographic diffuser 3, a first field lens 4, and a second field lens 5, all of which are aligned on the same axis. A Gaussian laser beam emitted from the laser light source 1 is divided by the beam expander 2, the holographic diffuser 3, the first field lens 4, and the second field lens 5 into beams with uniform rectangular sections.

Figure 2:
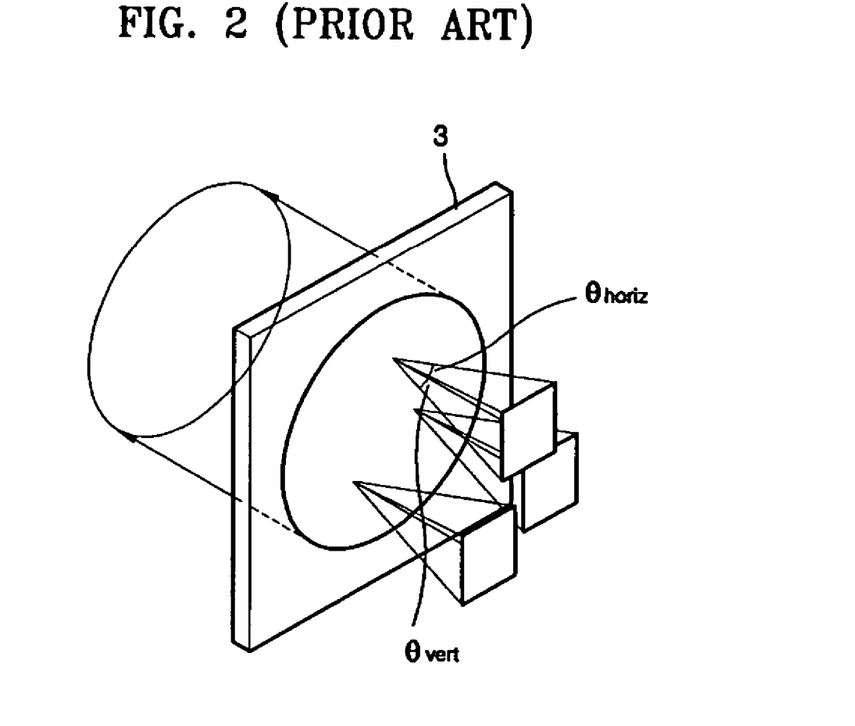
FIG. 2 is a diagram illustrating profiles of rectangular beams that are obtained after passing through a beam diffuser included in the conventional illumination system of FIG. 1.

Referring to FIGS. 1 and 2, the beam emitted from the laser light source 1 is expanded into a collimated beam by the beam expander 2. The collimated laser beam is divided by the holographic diffuser 3 into a plurality of rectangular beams. Each of the rectangular beams is diffused with a horizontal angle $\theta_{horiz}$ and a vertical angle $\theta_{vert}$. The horizontal angle $\theta_{horiz}$ and the vertical angle $\theta_{vert}$ can be adjusted according to a diffraction pattern of the holographic diffuser 3. The rectangular beams are converged by the first field lens 4 such that the beams with a Gaussian distribution are transformed into uniform beams. The rectangular beams are adjusted to have shapes corresponding to a micro display system. Beams having passed through the first field lens 4 are refracted into telecentric beams by the second field lens 5.

Since the collimated beam is transformed into the rectangular beams having a uniform intensity distribution by the holographic diffuser 3 and the rectangular beams are converged, laser speckle is reduced. However, when the laser speckle is reduced using only the holographic diffuser 3, the laser speckle is not completely eliminated and image quality deteriorates.

SUMMARY OF THE INVENTION

The present general inventive concept provides a compact illumination system which can effectively reduce or eliminate laser speckle by rotating or periodically moving a diffractive optical element, and a projection system employing the illumination system.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an illumination system including a laser light source including at least one laser to emit a beam, and a first diffractive optical element to divide the beam emitted from the laser light source into a plurality of partial beams and to time-average the partial beams through a periodical movement to eliminate speckle from the beam.

The foregoing and/or other aspects of the present general inventive concept may also be achieved by providing an illumination system including a laser light source including at least one laser to emit a beam, a first diffractive optical element to divide the beam emitted from the laser light source into a plurality of partial beams, and a wedge unit disposed ahead of or behind the first diffractive optical element to receive one of the beam emitted from the to laser light source and the partial beams and to change paths of the received one of the emitted beam and the partial beams by rotating and time-averaging the received one of the emitted beam and the partial beams to eliminate speckle.

The foregoing and/or other aspects of the present general inventive concept may also be achieved by providing a projection system including a laser light source including at least one laser to emit a beam, a first diffractive optical element to divided the beam emitted from the laser light source into a plurality of partial beams and to time-average the partial beams through a periodical movement to eliminate speckle from the beam, a second diffractive optical element to diffract the partial beams emitted from the first diffractive optical element such that the partial beams have a shape corresponding to a display element to form an image, the display element to form the image from beams that pass through the second diffractive optical element, and a projection lens unit to enlarge the image and to project the enlarged image onto a screen.

The first diffractive optical element may be rotatable or linearly reciprocable.

The foregoing and/or other aspects of the present general inventive concept may also be achieved by providing a projection system including a laser light source including at least one laser to emit a beam, a first diffractive optical element to divide the beam emitted from the laser light source into a plurality of partial beams, a wedge unit disposed ahead of or behind the first diffractive optical element to receive one of the beam emitted from the laser light source and the partial beams to change paths of the partial beams by rotating and time-averaging the partial beams to eliminate speckle, a second diffractive optical element to diffract the partial beams emitted from the first diffractive optical element such that the partial beams have a predetermined shape, a display element having the predetermined shape to form the image from the partial beams diffracted by the second diffractive optical element, and a projection lens unit to enlarge the image and to project the enlarged image onto a screen.

The second diffractive optical element may adjust a divergence angle of the partial beams to increase an F/number of the partial beams.

The partial beams may include a plurality of beamlets, and the plurality of beamlets may overlap and converge with each other.

The display element may include one of a transmissive liquid crystal display, a liquid crystal on silicon, a deformable micro device, and a grating light valve.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
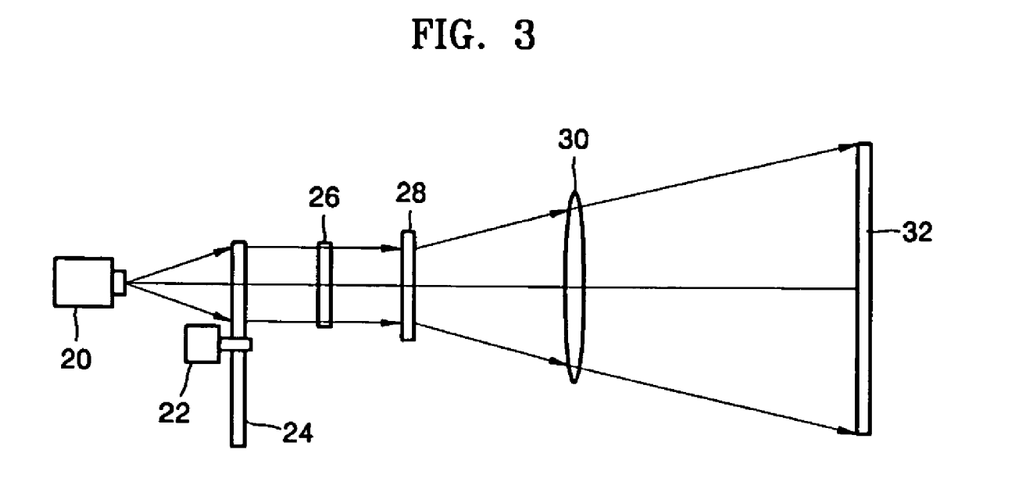
FIG. 3 is a schematic diagram illustrating a projection system according to an embodiment of the present general inventive concept.

FIG. 3 illustrates a projection system capable of eliminating speckle according to an embodiment of the present general inventive concept.

Referring to FIG. 3, the projection system includes a laser light source 20, a rotatable first diffractive optical element 24 which eliminates speckle of laser beams emitted from the laser light source 20, and a display element 28 which forms an image using beams passing through the first diffractive optical element 24.

A second diffractive optical element 26 to shape the beams passing through the first diffractive optical element 24 is disposed on a light path between the display element 28 and the first diffractive optical element 24. A projection lens unit 30 enlarges and projects the image formed by the display element 28 onto a screen 32.

Figure 4:
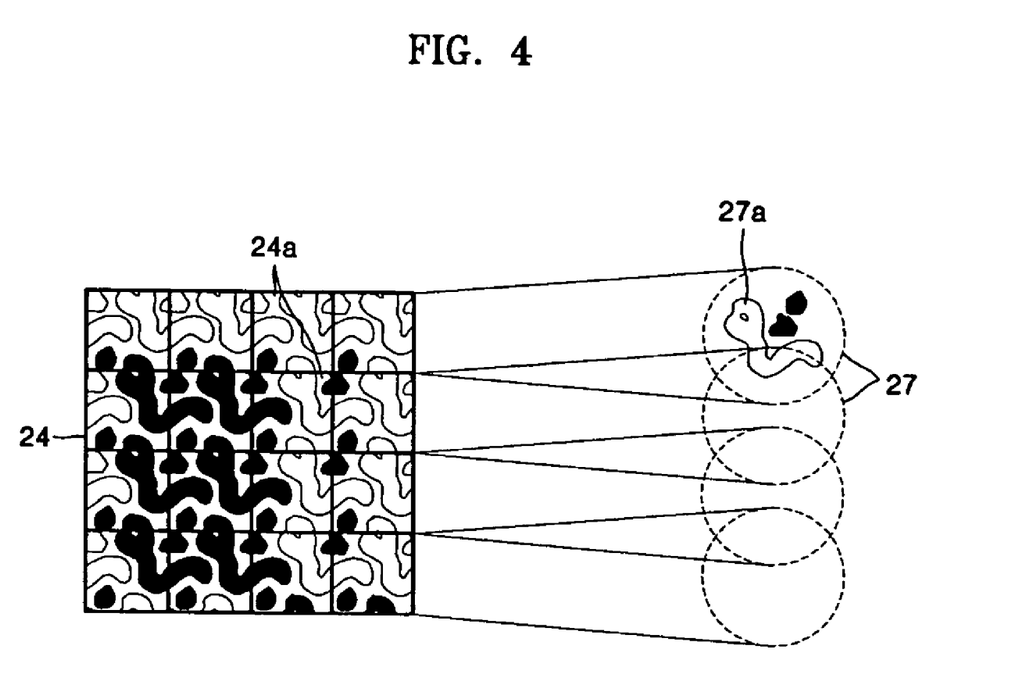
FIG. 4 is a diagram illustrating profiles of partial beams that are obtained after passing through a first diffractive optical element used in the projection system of FIG. 3.

The first diffractive optical element 24 is rotatable such that the beams from the laser light source 20 can be time-averaged and thus the speckle can be effectively eliminated. FIG. 4 illustrates operations of the first diffractive optical element 24. Referring to FIGS. 3 and 4, the first diffractive optical element 24 includes a plurality of unit cells 24a, which can be circular but can alternatively have various other shapes. Each beam from the laser light source 20 passes through the respective unit cells 24a of the first diffractive optical element 24 and is transformed into partial beams 27 having different phases and paths with respect to each other. The partial beams 27 can converge and overlap with each other. Each of the partial beams 27 includes a plurality of beamlets 27a.

Figure 5A:
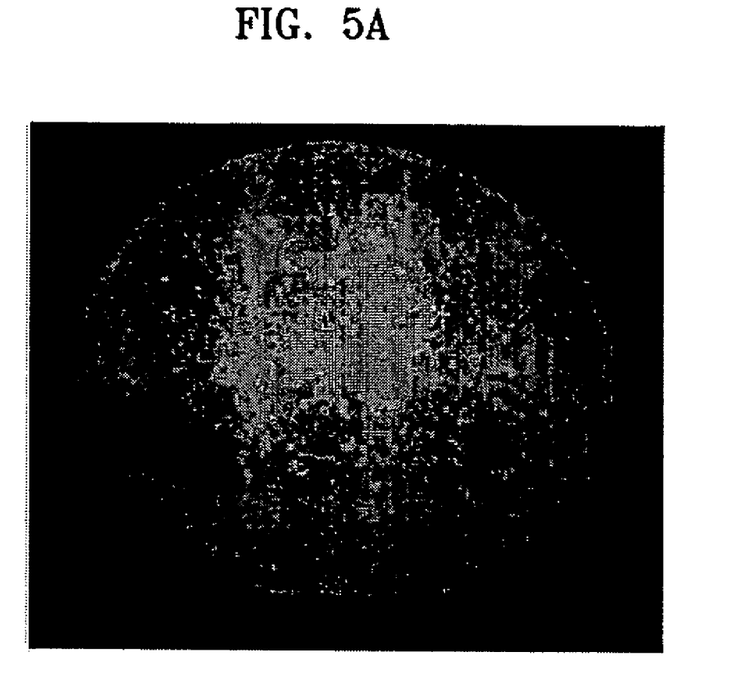
FIG. 5A is a photograph illustrating a beam before laser speckle is eliminated.
Figure 5B:
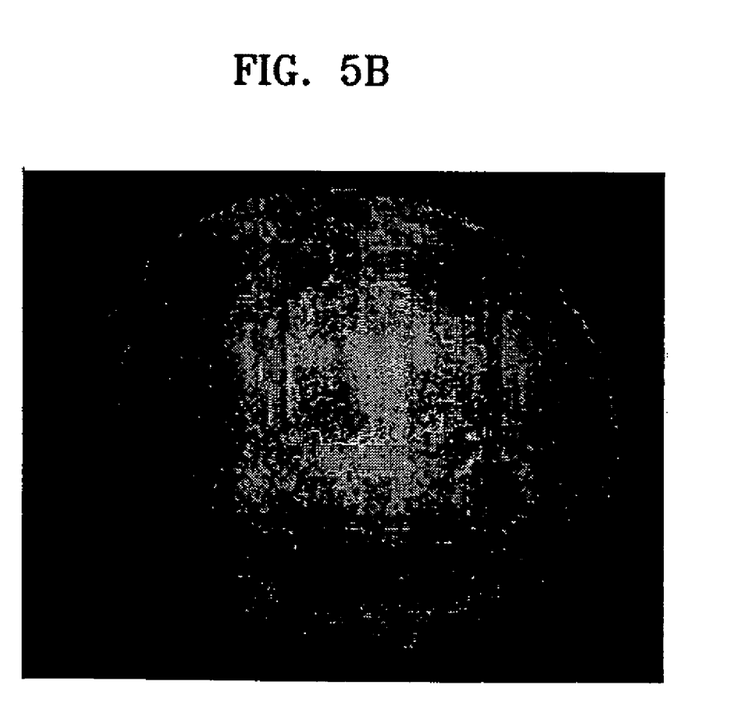
FIG. 5B is a photograph illustrating a beam after laser speckle is eliminated by an illumination system according to an embodiment of the present general inventive concept.

As the first diffractive optical element 24 is rotated by a motor 22, the beamlets 27a are time-averaged such that the speckle is eliminated. FIG. 5A illustrates a laser beam before the speckle is eliminated, and FIG. 5B illustrates the laser beam after the speckle is eliminated by rotating the first diffractive optical element 24 of the projection system as illustrated in FIGS. 3 and 4.

A contrast value C of a laser speckle pattern is given by the following equation, and the laser speckle pattern is invisible to naked eyes if the contrast value C is less than 4%.

$$C = \frac{\sqrt{\langle I_i^2 \rangle - \langle I_i \rangle^2}}{\langle I_i \rangle} = \frac{\sigma}{\mu} \times 100 (\%) \quad \text{Equation 1}$$

where $\langle I_i \rangle$ denotes an average intensity of light passing through an $i^{th}$ unit cell of the first diffractive optical element 24, $\sigma$ denotes a standard deviation, and $\mu$ denotes a mean value.

Each beam passing through the first diffractive optical element 24 is divided into the partial beams 27 having a uniform intensity distribution. That is, a laser beam having a Gaussian distribution, which is emitted from the laser light source 20, is divided into the plurality of partial beams 27 having a uniform intensity distribution, which converge with each other after passing through the first diffractive optical element 24, thereby improving image quality.

Figure 6:
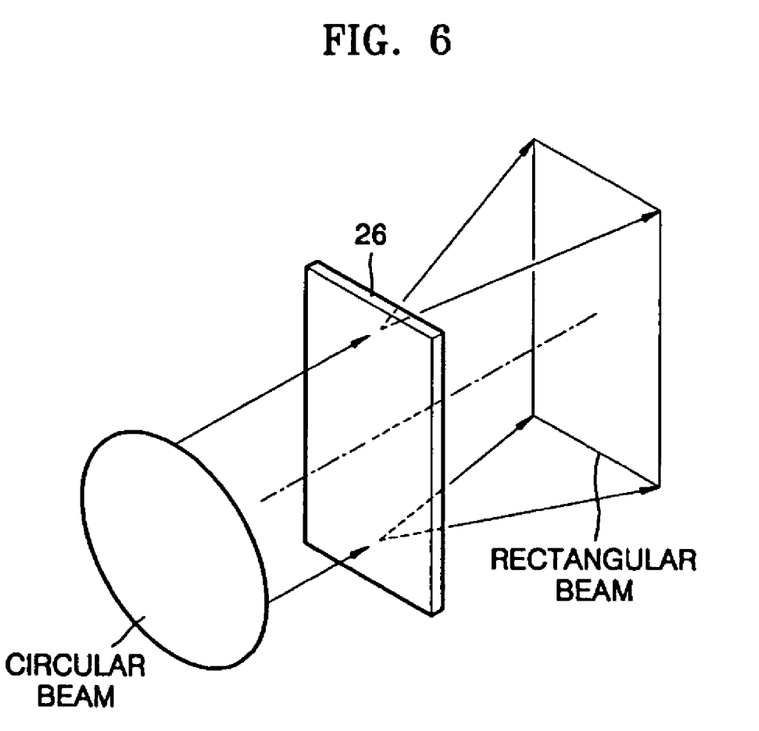
FIG. 6 is a diagram illustrating profiles of beams that are shaped by a second diffractive optical element included in the projection system of FIG. 3.

FIG. 6 illustrates operations of the second diffractive optical element 26. Referring to FIG. 6, the second diffractive optical element 26 diffracts the partial beams into sections corresponding to sections of the display element 28. The display element 28 may be a transmissive liquid crystal display (LCD), a liquid crystal on silicon (LCoS), a deformable micromirror device (DMD), a grating light valve, or the like. The display element 28 can be rectangular in shape with an aspect ratio of 4:3 or 16:9. Since the beams emitted from the laser light source 20 can have a different shape than that of the display element 28, it is necessary to enable the beams emitted from the laser light source 20 to have a shape corresponding to that of the display element 28. For example, as illustrated in FIG. 6, the second diffractive optical element 26 diffracts a circular beam so that the beam becomes a rectangular beam to correspond to the shape of the display element 28.

Further, a divergence angle of the beams can be controlled by adjusting a diffraction pattern of the second diffractive optical element 26. The projection system can be miniaturized by adjusting the divergence angle of the beams and increasing an F/Number (F/No) of the illumination system.

The beams shaped by the second diffractive optical element 26 are used by the display element 28 to form the image, and the image formed by the display element 28 is enlarged and projected onto the screen 32 by the projection lens unit 30.

The laser light source 20 may include a plurality of lasers that emit a plurality of laser beams having different wavelengths sequentially by color. For example, the laser light source 20 may include first, second, and third lasers that emit red (R), green (G), and blue (B) laser beams, respectively. The laser light source 20 sequentially emits the R, G, and B laser beams to sequentially form images with the R, G, B beams and the images are projected onto the screen 32 to realize a color image.

An illumination system according to an embodiment of the present general inventive concept includes the laser light source 20 including the plurality of lasers to emit the beams of the different wavelengths, the first diffractive optical element 24 to eliminate the speckle of the beams emitted from the laser light source 20, and the second diffractive optical element 26 to shape the beams corresponding to the display element 28. The first diffractive optical element 24 divides the each beam emitted from the laser light source 20 into the plurality of partial beams 27, and the partial beams are time averaged according to the rotation of the first diffractive optical element 24 to eliminate the speckle.

Figure 7:
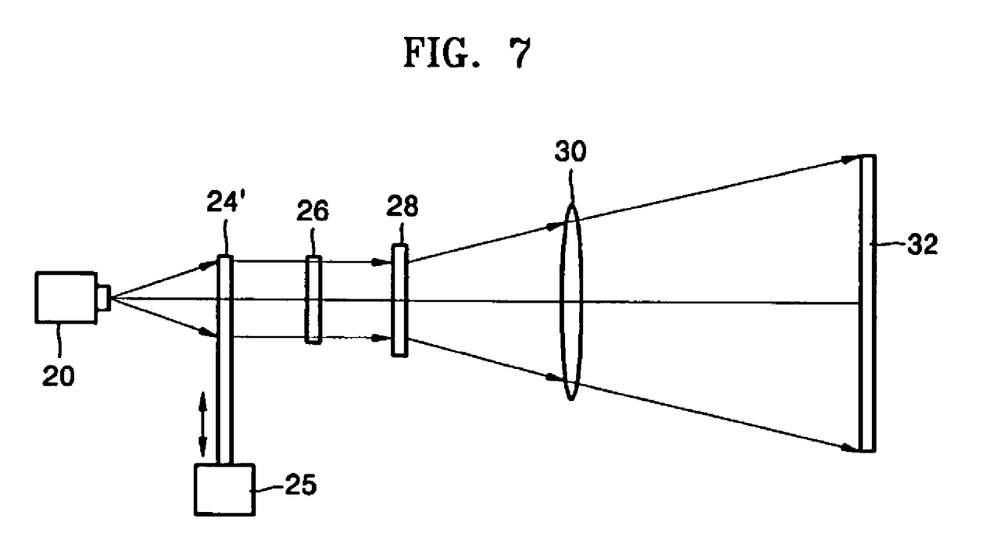
FIG. 7 is a diagram illustrating a modified example of the projection system of FIG. 3.

The speckle is eliminated by rotating the first diffractive optical element 24 to time-average the partial beams in the projection system of FIG. 3. FIG. 7 illustrates a projection system according to another embodiment of the present general inventive concept. Referring to FIG. 7, the speckle may be eliminated by linearly reciprocating a first diffractive optical element 24' using a moving unit 25 to time-average beams that pass through the first diffractive optical element 24'. Elements having the same reference numerals in FIGS. 3 and 7 operate the same, and therefore, a detailed explanation will be omitted.

Figure 8:
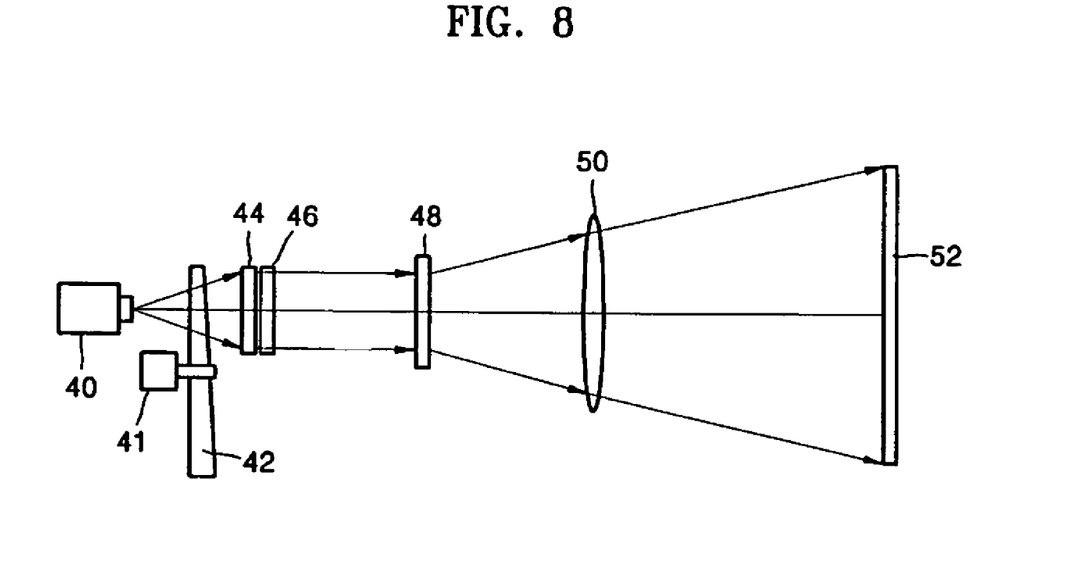
FIG. 8 is a schematic diagram illustrating a projection system according to another embodiment of the present general inventive concept.

FIG. 8 illustrates an illumination system and a projection system employing the illumination system according to another embodiment of the present general inventive concept.

Referring to FIG. 8, the illumination system includes a laser light source 40, a first diffractive optical element 44 that eliminates speckle of beams emitted from the laser light source 40, and a second diffractive optical element 46 that shapes the beams. A rotatable wedge unit 42 is disposed between the laser light source 40 and the first diffractive optical element 44, or between the first diffractive optical element 44 and the second diffractive optical element 46. The wedge unit 42 may be manufactured in the form of a plate (e.g., a glass plate) having a wedge-shaped section.

The laser light source 40 includes a plurality of lasers that emit laser beams having different wavelengths, and the wedge unit 42 can be rotated by a motor 41.

Figure 9:
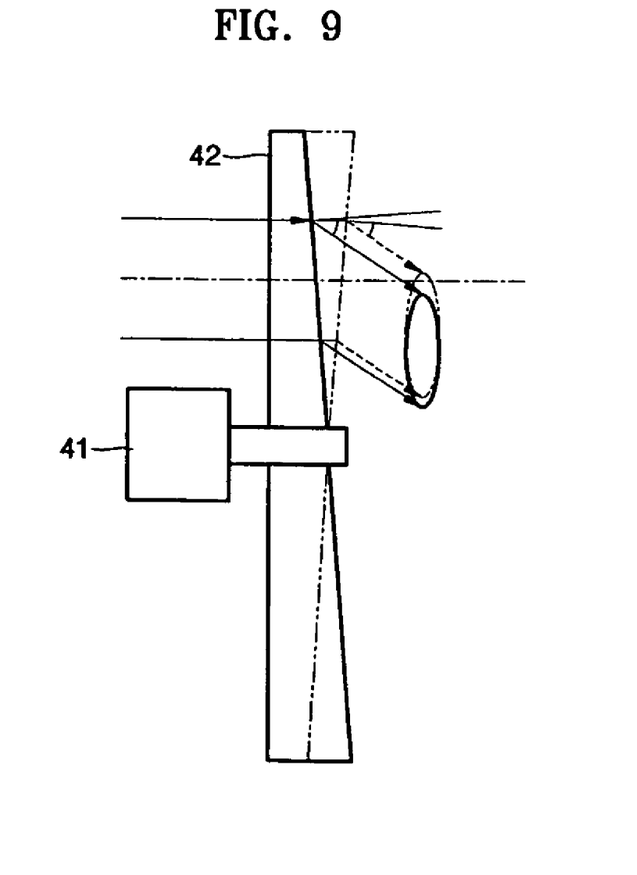
FIG. 9 is a diagram illustrating paths of beams periodically changing as a wedge unit used in the projection system of FIG. 8 rotates.

FIG. 9 illustrates operations of the wedge unit 42. Referring to FIG. 9, the beams emitted from the laser light source 40 are refracted as they pass through the wedge unit 42 toward the first diffractive optical element 44. Paths of the beams are periodically changed as the wedge unit 42 rotates. The first diffractive optical element 44 then divides each refracted beam into a plurality of partial beams. Each partial beam includes a plurality of beamlets.

Since the paths of the beams are periodically changed according to the rotation of the wedge unit 42 before the beams are incident on the first diffractive optical element 44, an effect similar to that of the projection system of FIG. 3 is obtained. Accordingly, the beams are time-averaged and laser speckle is eliminated. Furthermore, the partial beams converge with respect to each other such that beams having a Gaussian distribution can be transformed into beams having a uniform intensity distribution.

The beams that are emitted from the laser light source 40 can have a circular section, and the second diffractive optical element 46 transforms the beams into beams having a shape corresponding to the shape of a display element 48. The display element 48 forms an image from the beams transformed by the second diffractive optical element 46, and a projection lens unit 50 enlarges the image and projects the enlarged image onto a screen 52.

The laser light source 40 includes the plurality of lasers that emit the beams having the different wavelengths. The plurality of lasers sequentially emit the beams having the different wavelengths to produce a color image.

In the embodiment illustrated in FIG. 8, the speckle is eliminated by rotating the wedge unit 42 instead of the first diffractive optical element 44. The embodiment of FIG. 3, in which the first diffractive optical element 24 rotates, may require a larger area for the first diffractive optical element 24 and higher costs to design a diffraction pattern of the first diffractive optical element 24 as compared to the embodiment of FIG. 8.

According to the embodiments of the present general inventive concept, an illumination system can drastically reduce or eliminate speckle of beams emitted from a laser light source, and a projection system can employ the illumination system to achieve improved image quality.

As described above, a projection system according to the embodiments of the present general inventive concept can effectively eliminate speckle by rotating a diffractive optical element or a wedge unit to time-average partial beams. Moreover, since a divergence angle of the partial beams can be reduced using the diffractive optical element, the projection system can be compact.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illumination system comprising:
   a laser light source including at least one laser to emit a beam; and
   a first diffractive optical element having a plurality of unit cells to divide the beam emitted from the laser light source into a plurality of partial beams and to time-average the partial beams through a periodical movement to eliminate speckle from the beam.

2. The illumination system of claim 1, wherein the first diffractive optical element is rotatable.

3. The illumination system of claim 1, wherein the first diffractive optical element is linearly reciprocable.

4. The illumination system of claim 1, further comprising:
   a second diffractive optical element to diffract the partial beams emitted from the first diffractive optical element such that the partial beams have a shape corresponding to a display element to form an image.

5. The illumination system of claim 4, wherein the second diffractive optical element adjusts a divergence angle of the partial beams to increase an F/number of the partial beams.

6. The illumination system of claim 1, wherein each of the partial beams comprises a plurality of beamlets, and the plurality of beamlets overlap and converge with each other.

7. An illumination system comprising:
   a laser light source including at least one laser to emit a beam;
   a first diffractive optical element to divide the beam emitted from the laser light source into a plurality of partial beams; and
   a wedge unit disposed ahead of or behind the first diffractive optical element to receive one of the beam emitted from the laser light source and the plurality of partial beams and to change paths of the received one of the emitted beam and the partial beams by rotating and time-averaging the received one of the emitted beam and the partial beams to eliminate speckle.

8. The illumination system of claim 7, further comprising:
a second diffractive optical element to diffract the partial beams emitted from the first diffractive optical element such that the partial beams have a shape corresponding to a display element to form an image.

9. The illumination system of claim 8, wherein the second diffractive optical element adjusts a divergence angle of the partial beams to increase an F/number of the partial beams.

10. The illumination system of claim 7, wherein each of the partial beams comprises a plurality of beamlets, and the plurality of beamlets are overlapped and converged.

11. A projection system comprising:
a laser light source including at least one laser to emit a beam;
a first diffractive optical element having a plurality of unit cells to divide the beam emitted from the laser light source into a plurality of partial beams and to time-average the partial beam through a periodical movement to eliminate speckle from the beam;
a second diffractive optical element to diffract the partial beam emitted from the first diffractive optical element such that the partial beams have a shape corresponding to a predetermined shape;
a display element having the predetermined shape to form an image from the beams diffracted by the second diffractive optical element;
a projection lens unit to enlarge the image and to project the enlarged image; and
a screen to display the projected image.

12. The projection system of claim 11, wherein the first diffractive optical element is rotatable.

13. The projection system of claim 11, wherein the first diffractive optical element is linearly reciprocable.

14. The projection system of claim 11, wherein the second diffractive optical element adjusts a divergence angle of the partial beams to increase an F/number of the partial beams.

15. The projection system of claim 11, wherein each of the partial beams comprises a plurality of beamlets, and the plurality of beamlets overlap and converge with each other.

16. The projection system of claim 11, wherein the display element comprises one of a transmissive liquid crystal display (LCD), a liquid crystal on silicon (LCoS), a deformable micro device (DMD), and a grating light valve.

17. A projection system comprising:
a laser light source including at least one laser to emit a beam;
a first diffractive optical element to divide the beam emitted from the laser light source into a plurality of partial beams;
a wedge unit disposed ahead of or behind the first diffractive optical element to receive one of the beam emitted from the laser light source and the plurality of partial beam and to change paths of the received one of the emitted beam and the partial beams by rotating and time-averaging the received one of the emitted beam and the partial beams to eliminate speckle;
a second diffractive optical element to diffract the partial beams emitted from the first diffractive optical element such that the partial beams have a predetermined shape;
the display element having the predetermined shape to form an image from the beams diffracted by the second diffractive optical element;
a projection lens unit to enlarge the image and to project the enlarges image; and
a screen to display the projected image.

18. The projection system of claim 17, wherein the second diffractive optical element adjusts a divergence angle of the partial beams to increase an F/number of the partial beams.

19. The projection system of claim 17, wherein each of the partial beams comprises a plurality of beamlets, and the plurality of beamlets overlap and converge with each other.

20. The projection system of claim 17, wherein the display element comprises one of a transmissive liquid crystal display, a liquid crystal on silicon, deformable micro device, and a grating light valve.

21. An illumination system, comprising:
one or more lasers to emit beams of predetermined wavelengths; and
a moveable speckle elimination unit having plurality of unit cells in divide each beam emitted from the one or more lasers into a plurality of partial beam and to time-average the partial beams according to a movement thereof.

22. A method of eliminating speckle of a laser beam, the method comprising:
dividing a laser beam into a plurality of partial beams in a diffractive optical element having a plurality of unit cells; and
time averaging the plurality of partial beams by periodically moving the diffractive optical element having the plurality of unit cells.

23. An illumination system comprising:
a laser light source including at least one laser to emit a beam in a direction; and
a first diffractive optical element having a plurality of unit cells to divide the beam emitted from the laser light source into a plurality of partial beams and to time-average the partial beams of the unit cells through a periodical movement of the unit cells with respect to the direction to eliminate speckle from the beam,
wherein the unit cells move in a second direction perpendicular to the direction of the beam emitted from the laser light source to time-average the partial beams.

24. The illumination system of claim 23, wherein the unit cells are disposed in the second direction having an angle with the direction of the beam.

25. The illumination system of claim 23, wherein the unit cells are arranged in two directions having an angle with the direction of the beam.

* * * * *

UNITED STATES PATENT AND TRADEMARK OFFICE
CERTIFICATE OF CORRECTION

PATENT NO.       : 7,585,078 B2                                      Page 1 of 1
APPLICATION NO.  : 11/183874
DATED            : September 8, 2009
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 879 days.

Signed and Sealed this

Fourteenth Day of September, 2010

David J. Kappos
*Director of the United States Patent and Trademark Office*